Patented Aug. 2, 1932

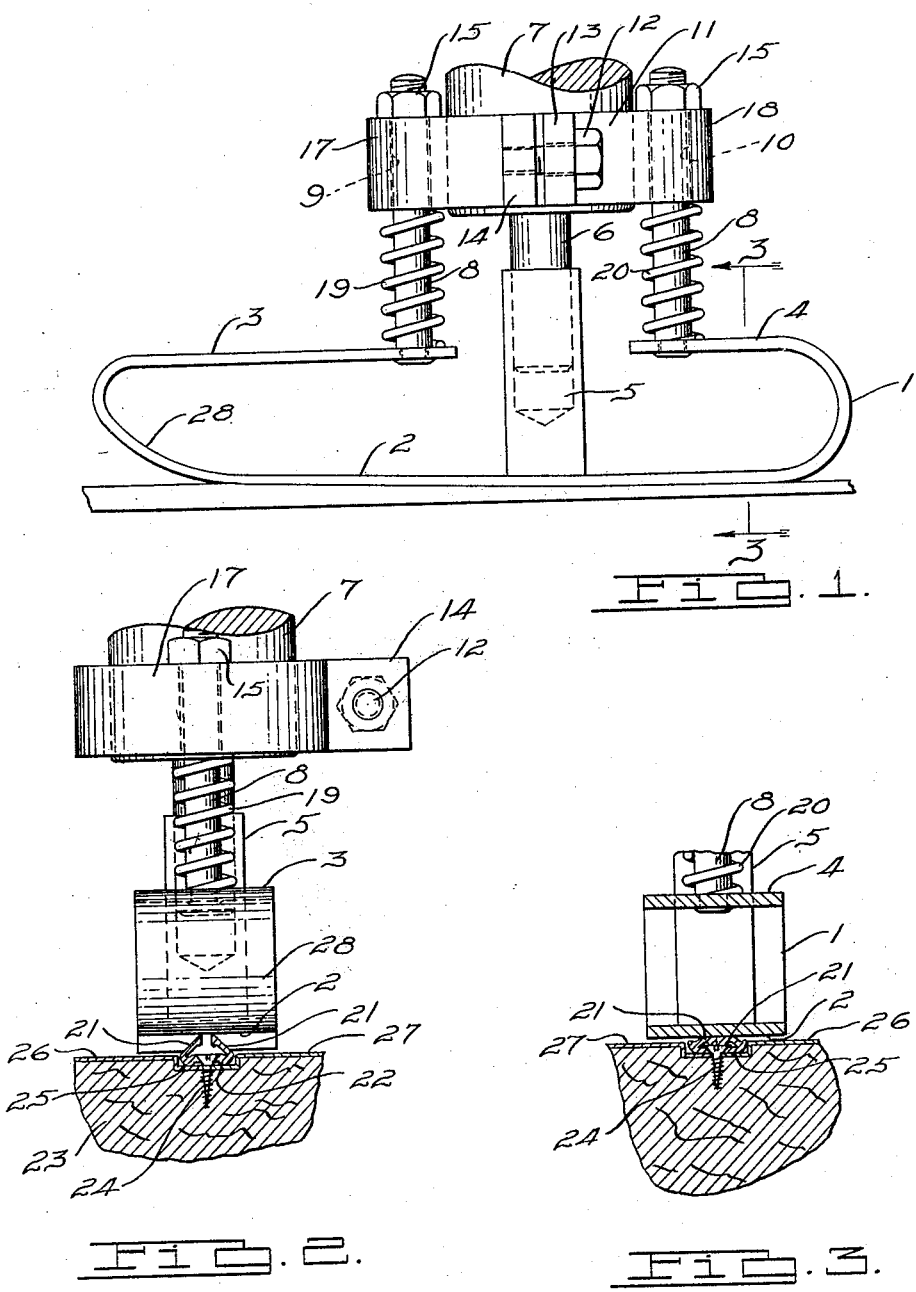

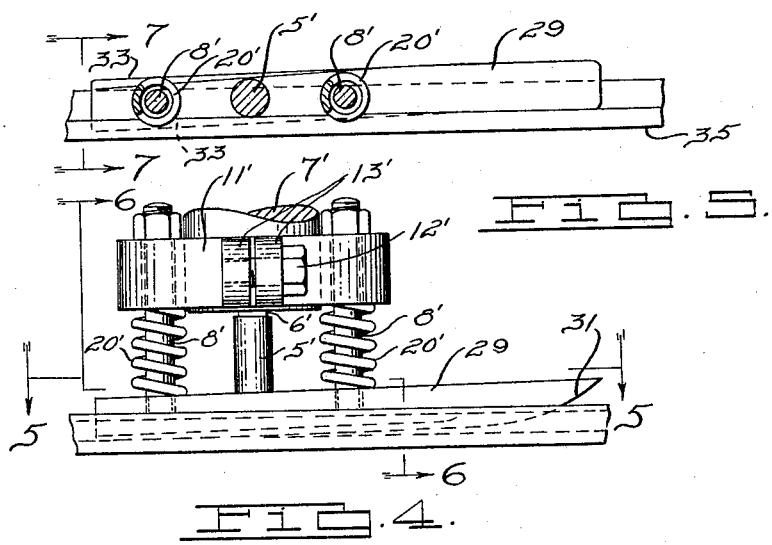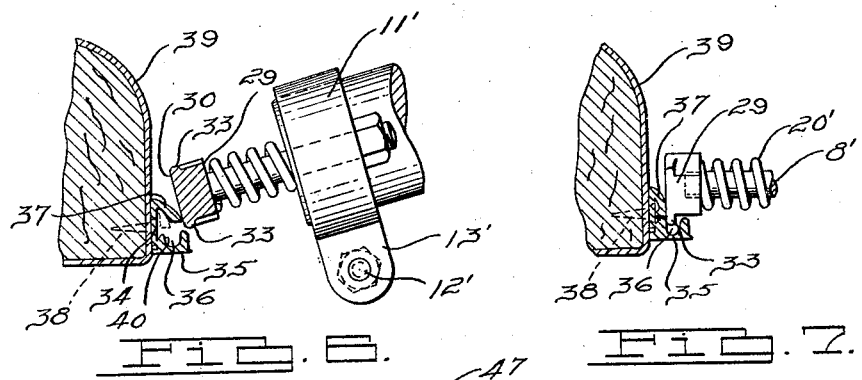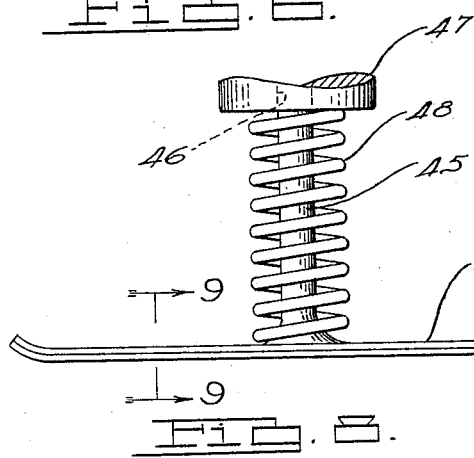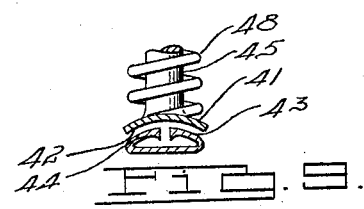

1,869,755

UNITED STATES PATENT OFFICE

ALONZO R. KETCHAM, OF DETROIT, MICHIGAN

MOLDING FORMING TOOL

Application filed August 27, 1930. Serial No. 478,016.

This invention relates to a tool for bending the sides of a molding into their ultimate form.

In order to conceal the heads of the nails, screws or other fastening members by which metal molding strips are secured in place, it is the practice to provide integral sides on the molding which are bent over the portions thereof through which the fastening members extend, after the molding is secured in its initial position. The use of conventional metal bending and forming tools in this operation is not practical for the reason that they are not capable of being transported and applied while the molding is secured to a support, such as for example, an automobile body. Forceful impact applied on a limited area of the molding is not permissible for such moldings generally function in decorative as well as structural capacities and even slight marring is objectionable.

The main objects of the invention are to provide a tool for performing bending operations on a molding strip after it is applied on a structure; to provide a portable tool of this kind which will operate upon moldings that are mounted on planular and arcuate surfaces with equal facility; and to provide a portable power driven tool of this kind.

Other objects of the invention are to provide a resilient working head, and resilient means for transmitting repeated impacts thereto in a tool of this kind so as to obviate marring and unintended deformation of the molding; to provide an elongated working head which distributes the impacts that it applies, upon a substantial area of a molding; to provide a work engaging side on the head of a molding tool which is curved upwardly at its forward end thereby enabling gradual reverse bending of the longitudinal side portions of the molding upon the intermediate part thereof during progressive forward movement of the tool; to provide a work head of this kind which is asymmetrically located with respect to the yieldable impact transmitting means whereby those portions of the work head which are successively remote from its front end are conditioned to apply impacts of gradually increasing intensities; and to provide a device of this kind that is adapted to absorb the recoil of a pneumatic hammer by which it is operated.

Further objects of the invention are to provide a head for a tool of this kind which is adapted to bend a longitudinal side flange of a drip molding reversely upon its trough part; and to provide a projecting side ridge on a drip molding forming tool which extends into the trough of the molding during operation.

An illustrative embodiment of my invention is shown in the accompanying drawings, in which:

Fig. 1 is a side elevation showing a molding forming tool which embodies my invention in operation.

Fig. 2 is a front end view of the tool shown in Fig. 1.

Fig. 3 is a transverse vertical section taken on line 3—3 of Fig. 1.

Fig. 4 is a side elevation showing a drip molding forming tool which embodies a further development of my invention.

Fig. 5 is a horizontal section taken on line 5—5 of Fig. 4.

Fig. 6 is a transverse vertical section taken on line 6—6 of Fig. 4.

Fig. 7 is a transverse vertical section taken on line 7—7 of Fig. 5.

Fig. 8 is a side elevation showing another form of the invention.

Fig. 9 is a vertical section taken on line 9—9 of Fig. 8.

In the form shown in Figs. 1 to 3, inclusive, the tool includes a head portion 1 which is formed of a flat strip of spring metal, preferably steel. The head 1 has a lower work engaging side 2 which is curved upwardly at its forward and rear ends. The front and rear end portions 3 and 4 of the metal strip are reversely bent with respect to the intermediate portion or work engaging side 2, the front end portion being longer than the rear end portion.

Mounted on the upper surface of the work engaging side 2 is a tubular post 5 in which a stem 6 of a reciprocating member 7 is received. The reciprocating member 7 preferably constitutes the ram or shank of a power driven hammer, not shown, which is either pneumatically or mechanically operated.

The inner extremities of the end portions 3 and 4 are provided with upstanding rods 8 which are slidably received in apertures 9 and 10 respectively of a yoke 11 which is detachably clamped on the reciprocating member 7 by a bolt 12. The bolt 12 extends through an aperture in a lug 13 and is threaded in a registering aperture of an adjacent lug 14, the lugs protruding outwardly from the ends of the yoke 11. Nuts 15 on the rods 8 secure the head against downward displacement from the yoke 11. Located between the end portions 3 and 4 and the bosses 17 and 18 of the yoke 11 in which the apertures 9 and 10 respectively are formed, are coil springs 19 and 20 which normally bear at their upper ends upon the lower extremities of the bosses, and at their lower ends upon the upper surfaces of the end portions 3 and 4.

In operation, my improved tool is generally employed to bend the longitudinal side portions or flanges of a molding of the type shown in Fig. 2 over the intermediate section 22 thereof. Moldings of this type are usually secured to a supporting structure such as the board 23, illustrated in Fig. 2, by a screw or nail 24 which is inserted through an aperture 25 in the intermediate portion 22 of the molding. When moldings of this kind are used in conjunction with sheet metal structures other fastening means such as rivets may be used. In the illustration shown in Fig. 3, the molding is located in a depression and has for its purpose the concealing of a seam between two sheet metal panels 26 and 27.

The molding is initially formed into a channel having an open side sufficiently large to admit the head of the fastening member. After the fastening member is applied the upstanding side flanges 21 are bent downwardly over the intermediate portion 22 of the molding so as to conceal the fastening members. This bending operation is conveniently accomplished by running the tool lengthwise of the molding in a forward direction. The upwardly curved front end 28 of the work engaging side 2 of the head of the tool permits the tool to be moved forwardly while the side 2 thereof is in engagement with the upper edges of the flanges 21 and during reciprocation of the ram 7, downward thrusts or impacts are repeatedly applied on the head 1. These thrusts are cushioned by the springs 19 and 20 and by the inherent resiliency of the head 1.

The upstanding bar 8 of the forward end portion 3 is further remote from the front extremity of the head than the bar 8 of the rear end portion 4 is remote from the rear extremity of the head. Thus the intensity of the force created by the thrusts of the ram is greater at the rear end of the head than that applied on the front end. The tool applies a gradually increasing pressure on selected portions of the flanges 21 of the molding as it is advanced forwardly. The front end portions of the tool initially bend the sides of the molding to the shape illustrated in Fig. 2 and the rear end portions flatten the molding out to the shape shown in Fig. 3.

With a tool of this type the upwardly protruding longitudinal edge portions of a molding strip are reversely bent with respect to the intermediate portion of the molding by an operation which closely simulates ironing. The cushioning action of the springs 20 and the inherent resiliency of the head of the tool prevent the molding from being marred or unintentionally deformed. By reciprocating the member 7 at a comparatively fast rate a substantially constant pressure is applied by the working side of the tool. The tool itself is completely portable and has very little weight so that it may be conveniently used on the sides and top of automobile bodies.

In Figs. 4, 5, 6 and 7 is shown a form of my invention which is particularly adapted for bending a projecting side of a drip molding inwardly upon the intermediate portion of the molding. With this type of molding bending tool a rigid head 29, of runner shape having a flat rear and intermediate working surface 30 on its lower side and an upwardly curved front end portion 31, is slidably mounted by rods 8' on a yoke 11' which is clamped on a reciprocating ram 7'. The yoke 11' has a pair of outwardly extending lugs 13' through which a bolt 12' is threaded for drawing the sides of the yoke together. The rearward rod 8' is located in closer proximity to the rear end of the head 29 than the front rod thereof is to the front end. Substantially midway between the rods is formed a tubular post 5' which receives a stem 6' carried by the ram 7'. The head 29 is yieldably held in spaced relation to the adjacent end of the ram 7' by springs 20' which surround the rods 8'.

The head 29 tapers in width towards its forward end and its respectively opposite sides are provided with outwardly extending ribs 33. These ribs are located adjacent the working surface 30 of the head and they extend from the rear extremity thereof to a location slightly in advance of the forward rod 8', the ribs being tapered throughout their entire lengths from their rear to their front extremities.

In operation, this type of head functions substantially the same as the yieldable head shown in Figs. 1 to 3, inclusive. It may be advantageously used in applying a drip molding of the type shown in Fig. 6 which has a vertical side 34, a horizontal side 35 having a trough 36 therein and an outwardly extending side flange 37. Drip moldings of this type are frequently used on vehicle bodies, in which case they are sometimes secured to the structure of the body by screws 38 which extend through apertures in the vertical side 34 of the molding. The vertical side of the molding may be spot welded, if desired, to the metal sheathing 39 by which the top structures of some vehicle bodies are covered.

After the drip molding is secured in place the projecting side flange 39 is bent inwardly substantially adjacent the side 34 of the molding by running the head of the tool along the edge of the flange 37 during repeated reciprocation of the ram 7' which may be actuated, as described, by any suitable means. The curved forward portion of the head permits the tool to be moved along in ironing fashion and as the forward extremity is comparatively remote from the locations at which the thrusts of the ram are applied on the head, less pressure is exerted on the side flange 37 by the forward end of the tool than by the rear and intermediate portions thereof. The front portion of the head affects the initial bending of the flange 37 and as the tool is moved forwardly in the direction of its length successive rearward portions of the head exert forces of increasing magnitude upon the flange 37 thereby bending the same to the position shown in Fig. 7.

As the tool is fed forwardly and the flange 37 is bent inwardly, the rib 33 on the lower edge of the head, as viewed in Fig. 6, is permitted to extend into the trough 36. The rib 33 applies pressure upon the inner edge portions of the flange 37 and upon a protruding ridge 40 which is located at the junction of the horizontal and vertical sides 34 and 35, respectively. The ridge 40 and flange 37 are thus forced into intimate contact with each other. They overlap the outer surface of the vertical side 34 of the molding and conceal the fastening means from view.

In the form shown in Figs. 8 and 9, the molding bending tool includes a head 41 which comprises a strip of metal having a concave lower working side 42 which is adapted to bend the respectively opposite side flanges 43 and 44 of a molding of the type shown in Fig. 9 into arcuate shape. The head 41 has upwardly curved extremities which permit the tool to be fed along a molding in either direction and it is provided substantially at its center with an upstanding stem 45 which is slidably received in a central aperture 46 of a reciprocating ram 47. The head 41 is yieldably held in spaced relation from the extremity of the ram 47 by a coil spring 48 which surrounds the stem 45 and which bears at one end against the upper side of the head 41 and at its other end against the lower extremity of the ram.

In each form of the invention the impacts created by reciprocation of the ram are cushioned by the coil springs and in the case of the tool shown in Figs. 1, 2 and 3, these impacts are further cushioned by the inherent resiliency of the head. The effect of this cushioning action is to substantially convert the periodic impacts into a somewhat uniform pressure which bends the flanges of the molding without marring them.

Although but several specific embodiments of this invention have been herein shown and described, it will be understood that numerous details of the construction shown may be altered or omitted without departing from the spirit of this invention as defined by the following claims.

What I claim is:—

1. A tool for forming sheet metal including an elongated head part having a curved forward work engaging surface and an adjacent substantially tangential work engaging surface, a reciprocating ram, means slidably supporting said head part on said ram, and a yieldable resilient member bearing between said ram and said head part.

2. A tool for bending portions of a sheet metal molding strip including a head having an elongated work engaging side, a reciprocating ram, means slidably supporting said head on said ram, and compressible means between said ram and said head for applying the thrusts of said ram thereon, said compressible means being located closer to the rear end of said work engaging side than to the front end thereof.

3. A tool for bending a projecting flange of a molding strip upon the body thereof including a head having an elongated work engaging side, and means for applying pressure thereon, said means being asymmetrically arranged with respect to the longitudinal extremities of said work engaging side so as to apply a greater force on one end portion than on the other.

4. In a tool for bending a projecting flange of a molding strip upon the body thereof, a head portion including a spring metal member having its end portions reversely bent over its intermediate portions, a reciprocating element, means slidably supporting said head on said element, and resilient compressible members between the reversely bent ends of said head and said reciprocating element for applying repeated cushioned impacts on said head during reciprocating of said head.

5. In a tool for bending a projecting flange of a molding strip upon an adjacent portion thereof, a head including a spring metal member having its end portions reversely bent with respect to its intermediate portions, the forward reversely bent end portion being longer than the rear reversely bent end portion, a reciprocating element, supports on the inner ends of said reversely bent end portions, means for slidably securing said supports to said reciprocating element, and springs on said supports for cushioning the movements of said reciprocating element towards said head.

6. In a tool for bending a projecting flange of a drip molding having a trough at its intermediate portion, a rigid runner-like elongated head, a reciprocating impact applying element, means slidably supporting said head on said element, and a cushioning member located between said head and said element for cushioning relative movement of said element toward said head.

7. In a tool for bending a projecting flange of a drip molding having a trough at its intermediate portion, a rigid runner-like elongated head, a reciprocating impact applying element, means slidably supporting said head on said element, a cushioning member located between said head and said element for cushioning relative movement of said element toward said head, and a laterally projecting rib on said head adapted to extend into said trough so as to flatten the edge portions of said flange against a side of said trough.

8. In a tool for bending a projecting flange of a drip molding having a trough at its intermediate portion, a rigid runner-like elongated head, a reciprocating impact applying element, means slidably supporting said head on said element, and a resilient member located between said head and said reciprocating member for transmitting cushioned impacts to the latter, the leading extremity of said head being remote from the location at which the impacts are applied so as to successively subject a portion of said flange to pressures of increasing intensities during forward movement of said tool.

9. In a tool for bending a projecting flange of a drip molding having a trough at its intermediate portion, a rigid runner-like elongated head, a reciprocating impact applying element, means slidably supporting said head on said element, a resilient member located between said head and said reciprocating member for transmitting cushioned impacts to the latter, the leading extremity of said head being remote from the location at which the impacts are applied so as to successively subject a portion of said flange to pressures of increasing intensities during forward movement of said tool, and a forwardly tapered laterally projecting rib on a side of said head adapted to extend into said trough so as to force the flange of said molding against the side of the trough.

10. In a tool for bending a projecting flange of a drip molding having a trough at its intermediate portion, a rigid runner-like elongated head, a reciprocating impact applying element, means slidably supporting said head on said element, a resilient member located between said head and said reciprocating member for transmitting cushioned impacts to the latter, the leading extremity of said head being remote from the location at which the impacts are applied so as to successively subject a portion of said flange to pressures of increasing intensities during forward movement of said tool, and a forwardly tapered laterally projecting rib on a side of said head adapted to extend into said trough so as to force the flange of said molding against the side of the trough, the forward end of said head being in advance of the tapered extremity of said rib for initially bending said flange into said trough so as to admit said rib thereafter.

11. In combination with a ram of a power driven hammer, a head having a smooth surfaced and resilient work engaging side adapted to bend a projecting side flange of a molding inwardly upon its intermediate portions.

ALONZO R. KETCHAM.